Feb. 9, 1937.   L. GOLDHAMMER   2,070,122
ROLL FILM CAMERA
Filed Nov. 6, 1934
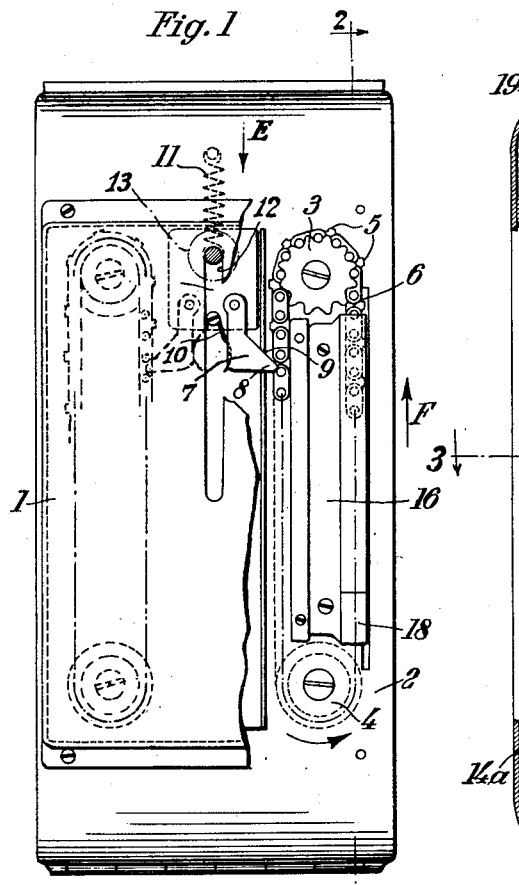
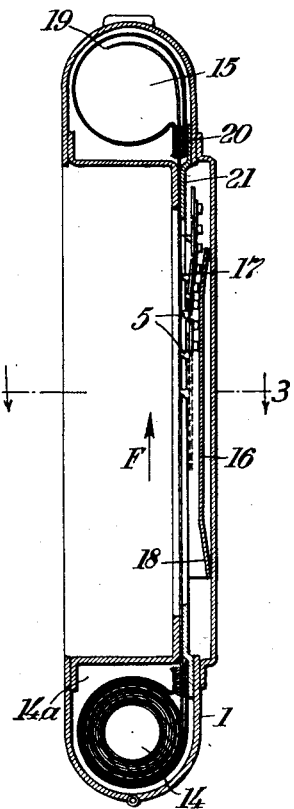
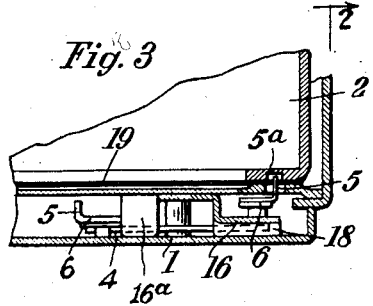
Inventor:
Leo Goldhammer,
By   Attorney
Philip S. Hopkins.

Patented Feb. 9, 1937

2,070,122

UNITED STATES PATENT OFFICE 2,070,122

ROLL FILM CAMERA

Leo Goldhammer, Munich, Germany, assignor to Agfa Ansco Corporation, Binghamton, N. Y., a corporation of New York Application November 6, 1934, Serial No. 751,776
In Germany November 9, 1933

4 Claims. (Cl. 95—31)

My present invention relates to a roll film camera.

Hitherto it has been usual in large size roll-film cameras and panorama cameras to employ roll-films wound on a spool. As is well-known, such films are provided with a protective strip of paper bearing printed numbers, which extends beyond the beginning and the end of the film band and is intended to protect the light-sensitive layer from harmful light, before, during and after exposure. Apart from the troublesome and, therefore, relatively expensive preparation of this known roll-film packing, it is associated with the following disadvantages: First of all the stuck paper end must be torn open by means of the finger nail or the like, the end of the paper must be threaded into the slot of an empty film spool, and the spool key must be turned until the first film section arrives in the picture frame. After the last film has been exposed, the paper end must again be wound up and, after removal from the camera, the projecting end of the paper strip must be stuck down.

It is an object of this invention to provide a roll film camera in which this tedious manipulation is avoided.

Another object is to provide a roll film camera which avoids the disadvantage associated with roll-film cameras of the usual type, in that the film of the extraordinarily high sensitivity now usual is easily fogged through the number window in the casing of the camera.

Still another object is to provide a roll-film camera in which the film is advanced on each separate occasion to the extent of the whole height or half the height of the picture by a forwarding device actuated from outside.

A further object is to provide a roll film camera with a film advancing device as described below so that, for the purpose of developing in advance, parts of the film can be cut out without any substantial loss of film, and be removed from the camera, without it being necessary to thread the film remaining in the camera into a winding device or to stick it to a protective paper strip.

A further object is to provide a roll film camera in which by means of the new film advancing device the film can be inserted easily in cold weather and even with gloved hands. Further objects will be seen from the detailed specification following hereafter. Reference is made to the accompanying drawing in which Fig. 1 shows the back view of a roll-film camera, with a part of the back wall partially removed in order that the conveyer chain and the advancing mechanism located beneath it may be seen, Fig. 2 shows a section of the roll-film camera as seen from the side along the line 2—2 of Fig. 1, and Fig. 3 shows a partial section along the line 3—3 of Fig. 2 on an enlarged scale.

The roll-film camera according to the invention is distinguished by the fact that the insertion device for the film is at the same time a film advancing device. When the lid of the camera casing is closed, it automatically seizes in an appropriate manner the end of the film without it being necessary for it to be inserted in a spool slot or in the insertion slot of a winding box. When the film advancing device is set in operation the film is advanced in each particular case to the extent of the height of the picture and is automatically inserted in the slot of the winding box in which it rolls up on itself.

The new camera is intended chiefly for use of a non-perforated film without protective paper which is placed in a light-excluding box in the camera. The invention is not, however, limited thereto, but can also be used in connection with a perforated film provided with protective paper.

The film advancing device consists appropriately of one or more chains disposed in the rear wall of the camera and provided with a plurality of gripping teeth which, when sprocket wheels engaging the chains are rotated, are brought in and out of engagement with the film band by means of an inclined guide surface. The gripping teeth are in constant contact with the part of the film engaged by them. In this arrangement it has been found to be advantageous to allow the teeth to engage over a relatively great length, say at least half the height of a picture.

The invention will now be described with reference to the accompanying drawing.

In the rear wall 1 of the roll-film camera there are mounted on either side two sprocket wheels 3 and 4 respectively and over each pair of wheels a chain 6 provided with teeth 5 is passed. The chain 6 is set in motion in the direction indicated by the arrow E by means of the pawl 7. When pressed down, the pawl 7 takes with it by means of the projection 8, the chain 6, while on flying back to its initial position, the pawl slides loosely with its inclined surface 9 along the chain members without carrying the chain with it. The spring that influences the pawl 7 is designated by 10, while the return spring for the advancing mechanism bears the number 11. The pawl 7 is pivotally connected to a guide plate 12 which also carries the finger button 13 which is adapted to be actuated from the outside of the camera.

The film is thrust by the advancing device from the paying-off box 14 into the take-up box 15. In the rear wall there is fixed a rigid guide plate 16, inclined surfaces 17 and 18 on which cause the outer chain members to stick into the film and carry it in the direction indicated by the arrow F. On the guide plate 16 there is mounted a guide ledge 16a to ensure that chain 6 will be gripped by the projection 8 of the pawl 7. The gripping teeth 5 thus come into contact with the film only on the outer sides of the chain, whereas the chain members located in the direction of advance of the chain with relation to them in contact with the film are so remote from the plane of the film that the teeth thereon do not engage the film. While gripping the film, the teeth 5 move in a groove 5a provided in the frame of the exposure window.

The mode of operation of the apparatus is as follows:

The paying off box 14 charged with a non-perforated film having no protective paper is inserted into the lower spool chamber 14a, the end of the film projecting to the extent of about one-third the height of a picture. The empty take-up box 15 is then inserted in the upper spool chamber 15a, and the rear wall 1 of the camera is closed. When the camera is closed, the teeth 5 engage in the projecting end of the film 19. Now, when it is intended that the first photograph shall be taken, the button 13 is drawn downwardly in the direction indicated by the arrow E against the influence of the spring 11, so that the chain 6 is set in motion and the film is advanced to the extent of the height of a picture. By means of this conveyer device it is possible to advance the film to the extent of the height of one or two pictures and accordingly after the insertion or the removal of a mask, to obtain pictures measuring 4½x6 or 6x9. If the larger pictures are required, after the removal of the mask the button is pressed down twice, whereas for the subdivided pictures one depression of the button 13 is sufficient.

When the first photograph has been taken, the free end 19 of the film passes automatically into the insertion channel 20 of the take-up box 15. As the film band is seized on both sides by the teeth and is securely conducted by the film guide 21, it cannot deviate in any direction. When further moved, the film is wound up on itself in the take-up box 15 and, after having been wound up completely can be removed from the camera in daylight. By means of the apparatus it is possible, as a matter of course, also to separate individual pictures and to develop them in advance of the others, without incurring loss of film. With this object in view the film is cut through at the desired position in the dark room, and the free end of the film is thrust into the paying-off box, or drawn out thereof, until the lowest teeth of the conveyer device are able to engage in the film when the camera is closed. The other free end of the film is thrust into the take-up box and can now be developed separately. In order to finish the other photographs, it is necessary for a new, empty take-up box to be placed in the apparatus; the new film advancing device attends to the threading and the further advance of the film.

What I claim is:

1. In a roll film camera in combination, a casing, a take-up box and a paying-off box, a chamber provided in the upper and the lower part of said casing for receiving said boxes, means for guiding a film past an aperture from said paying off box to said take-up box, a lid for closing said casing, and means adapted to engage an unperforated film for advancing said film from said paying-off box to said take-up box, and means for maintaining said film advancing means in continuous engagement with an unperforated film.

2. In a roll film camera in combination, a casing, a take-up box and a paying-off box, a chamber provided in the upper and the lower part of said casing for receiving said boxes, means for guiding a film past an aperture from said paying-off box to said take-up box, a lid for closing said casing, and means comprising gripping teeth for advancing said film from said paying-off box to said take-up box, and means for maintaining part of said gripping teeth in continuous engagement with an unperforated film.

3. In a roll film camera in combination, a casing comprising a back wall, a take-up box and a paying-off box, a chamber provided in the upper and the lower part of said casing for receiving said boxes, means for guiding a film from said paying-off box to said take-up box, a lid for closing said casing, two sprocket wheels mounted on said back wall, an endless chain wound around said sprocket wheels, teeth provided on said endless chain on the side facing said aperture, a guide plate mounted on said back wall adapted to bring part of said teeth in continuous engagement with an unperforated film, and means for moving said chain for advancing said film.

4. In a roll film camera in combination, a casing comprising a back wall, a take-up box and a paying-off box, a chamber provided in the upper and the lower part of said casing for receiving said boxes, means for guiding a film from said paying-off box to said take-up box, a lid for closing said casing, two sprocket wheels mounted on said back wall, an endless chain wound around said sprocket wheels, teeth provided on said endless chain on the side facing said aperture, a guide plate mounted on said back wall adapted to bring part of said teeth in continuous engagement with an unperforated film, a second guide plate mounted between said lid and said back wall, a pawl mounted on said second guide plate, a spring mounted on said second guide plate for pressing said pawl against said chain so that it engages the latter, a button mounted on said second guide plate and extending through a slot provided in said lid and extending in the direction of the film travel for moving said chain, and means for bringing said guide plate back to its starting position after advancing said film.

LEO GOLDHAMMER.